United States Patent
Akisada et al.

(10) Patent No.: US 7,539,773 B2
(45) Date of Patent: May 26, 2009

(54) NETWORK SYSTEM USING IPV4/IPV6 TRANSLATOR

(75) Inventors: Yukiyo Akisada, Musashino (JP); Hiroshi Miyata, Musashino (JP)

(73) Assignee: Yokogawa Electric Corporation, Tokyo (JP)

(*) Notice: Subject to any disclaimer, the term of this patent is extended or adjusted under 35 U.S.C. 154(b) by 773 days.

(21) Appl. No.: 10/988,493

(22) Filed: Nov. 16, 2004

(65) Prior Publication Data

US 2006/0106943 A1 May 18, 2006

(51) Int. Cl.
*G06F 15/16* (2006.01)
*G06F 15/173* (2006.01)

(52) U.S. Cl. .......... 709/245; 709/230; 709/238; 709/246

(58) Field of Classification Search .......... 709/230, 709/246, 238, 245
See application file for complete search history.

(56) References Cited

U.S. PATENT DOCUMENTS

| | | | |
|---|---|---|---|
| 6,862,274 B1* | 3/2005 | Tsao et al. | 370/338 |
| 7,031,328 B2* | 4/2006 | Thubert et al. | 370/401 |
| 7,305,480 B2* | 12/2007 | Oishi et al. | 709/230 |
| 7,310,351 B2* | 12/2007 | Asano et al. | 370/466 |
| 7,328,281 B2* | 2/2008 | Takeda et al. | 709/246 |

FOREIGN PATENT DOCUMENTS

JP 2002-328869 11/2002

* cited by examiner

*Primary Examiner*—Ario Etienne
*Assistant Examiner*—Hussein A El Chanti
(74) *Attorney, Agent, or Firm*—Westerman, Hattori, Daniels & Adrian, LLP.

(57) ABSTRACT

A network system wherein it is possible to reduce the amount of load on the mobile node and the amount of traffic from the mobile node to the IPv4/IPv6 translator and it is possible for the IPv4/IPv6 translator to know the node's current position within the IPv6 network in which the mobile node is moving. The network system having an IPv4/IPv6 translator for bilaterally translating packets between IPv6 and IPv4 protocols, where the translator is equipped with an address table for storing home addresses and care-of addresses in pairs for each MIPv6 mobile node and the translator is made to behave as a correspondent node of the MIPv6 mobile node in question after the mobile node has moved out of the home link thereof.

3 Claims, 8 Drawing Sheets

| |
|---|
| IPv6 header<br>    Source address: Virtual IPv6 address corresponding to IPv4 address<br>    Destination address: Home address |
| ICMPv6 Message<br>    Type: Parameter problem<br>    Code: Unrecognized next header type encountered<br>    Type: Imvoking packet |

FIG. 13

| |
|---|
| IPv6 header<br>    Source address: Virtual IPv6 address corresponding to IPv4 address<br>    Destination address: Care-of address |
| ICMPv6 Message<br>    Type: Parameter problem<br>    Code: Unrecognized next header type encountered<br>    Type: Imvoking packet |

FIG. 14

| |
|---|
| IPv6 header<br>    Source address: Virtual IPv6 address corresponding to IPv4 address<br>    Destination address: Home address |
| Mobility header<br>    Type: HoT |

FIG. 15

| |
|---|
| IPv6 header<br>    Source address: Virtual IPv6 address<br>    corresponding to IPv4 address<br>    Destination address: Care-of address |
| Mobility header<br>    Type: CoT |

FIG. 16

| |
|---|
| IPv6 header<br>    Source address: Care-of address<br>    Destination address: Virtual IPv6 address<br>    corresponding to IPv4 address |
| Destination option header<br>    Home address option<br>    Address: Home address |
| Mobility header<br>    Type: BU (binding update) |

FIG. 17

| IPv6 header<br>    Source address: Virtual IPv6 address<br>    corresponding to IPv4 address<br>    Destination address: Care-of address |
| --- |
| Routing header<br>    Type: 2<br>    Segment Left: 1<br>    Address: Home address |
| Mobility header<br>    Type: BA (binding acknowledgment) |

NETWORK SYSTEM USING IPV4/IPV6 TRANSLATOR

BACKGROUND OF THE INVENTION

1. Field of the Invention

The present invention relates to the improvement of a network system using an IPv4/IPv6 translator that performs address translation between an IPv6 terminal that uses IPv6 (Internet Protocol version 6) as the communication protocol thereof and an IPv4 terminal that uses IPv4 (Internet Protocol version 4) also as the communication protocol thereof.

2. Description of the Related Art

Patent document 1 mentioned below discloses the technology intended to make mobile IP communication possible in an environment where IP networks using a plurality of IP protocol versions coexist.

However, patent document 1 is specifically concerned with a mechanism whereby an IPv6 node belonging to an IPv6 network notifies a home agent of the node's current position when the node has moved out to an IPv4 network.

In contrast, the present invention relates to a mechanism designed for the IPv6 node to notify the IPv4/IPv6 translator of the node's care-of address when the IPv6 node moves out of the home link to an external link within the IPv6 network. Thus, the present invention differs from the invention described in patent document 1 in that the IPv6 node does not move out to the IPv4 network.

Patent Document 1:

Japanese laid-open patent application 2002-328869

Figure 1:
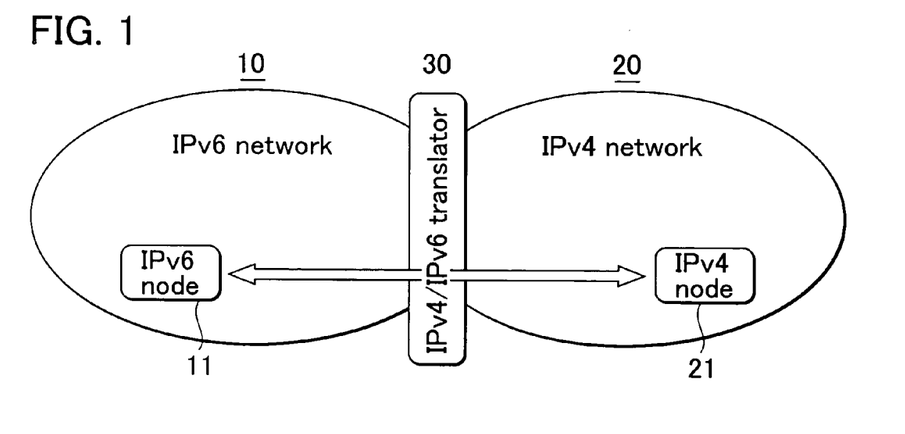
FIG. 1 is a schematic block diagram illustrating an example of a network system that uses a conventional IPv4/IPv6 translator.

FIG. 1 is a schematic block diagram illustrating an example of a network system that uses a conventional IPv4/IPv6 translator.

In FIG. 1, IPv4/IPv6 translator 30 bilaterally translates packets between IPv6 and IPv4 protocols in communication between IPv6 node 11 belonging to IPv6 network 10 and IPv4 node 21 belonging to IPv4 network 20, thus making communication possible between nodes with different protocols.

On the other hand, Mobile IPv6 (hereinafter referred to as MIPv6) has been proposed as another IPv6 protocol functionally enhanced for use with mobile nodes. With this MIPv6, it is possible for a mobile node to move between IPv6 networks by using a permanent IP address (home address), while maintaining an ongoing communication link. When communicating with a target correspondent node from an external link using a route optimization function, the mobile node sends an HOTI (Home Test Init: home test initialization) packet and a COTI (Care-of Test Init: care-of test initialization) packet to the correspondent node.

Figure 2:
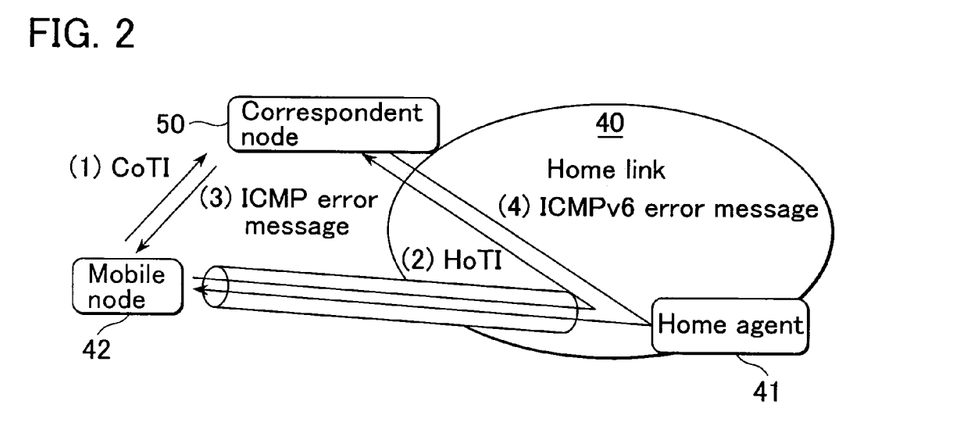
FIG. 2 is a schematic block diagram illustrating system operation when correspondent node 50 has no route optimization function.
Figure 3:
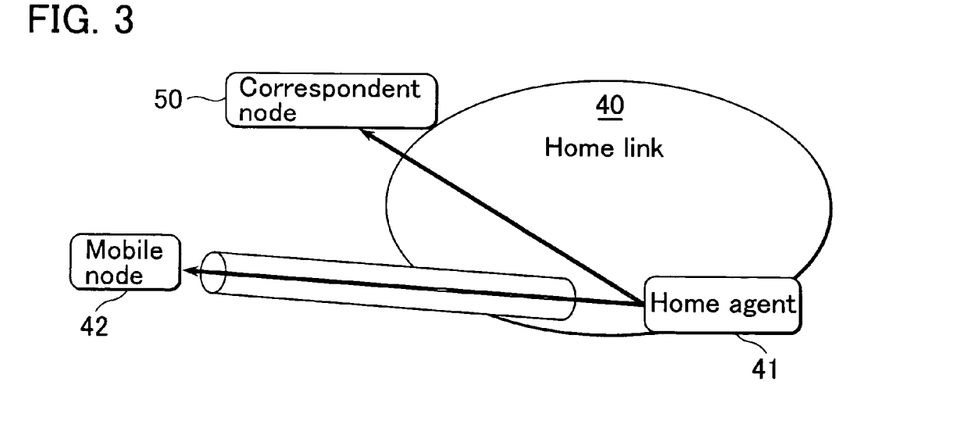
FIG. 3 is a schematic block diagram illustrating system operation when a bidirectional tunnel is used.

FIG. 2 is a schematic block diagram illustrating system operation when correspondent node 50 has no route optimization function. Correspondent node 50 returns ICMP (Internet Control Management Protocol) error packets (3) and (4) in response to COTI (1) or HOTI (2) packets sent from mobile node 42. Upon receipt of ICMP error packet (3), mobile node 42 immediately stops resending HOTI (2) and COTI (1) packets, and does not conduct any route optimization procedure. At this point, mobile node 42 communicates with correspondent node 50 through home agent 41 by using a bidirectional tunnel, as shown in FIG. 3.

Figure 4:
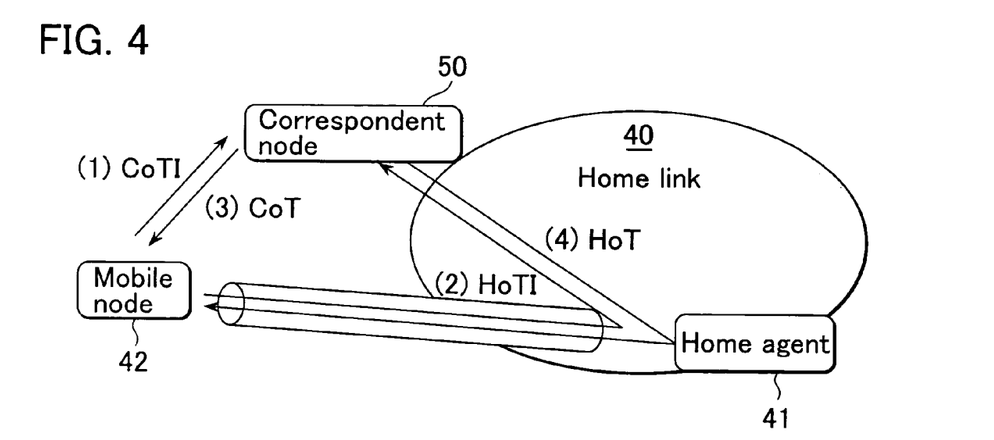
FIG. 4 is a schematic block diagram illustrating system operation when correspondent node 50 has a route optimization function.
Figure 5:
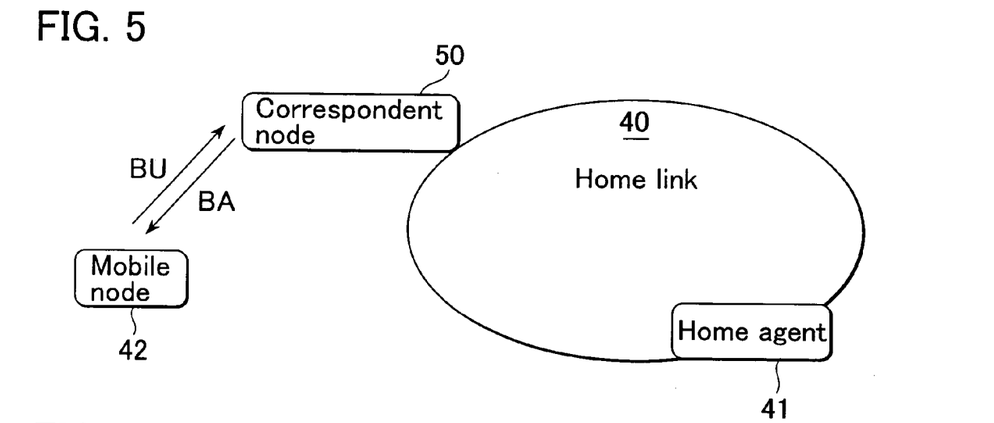
FIG. 5 is a schematic block diagram illustrating a position registration procedure.
Figure 6:
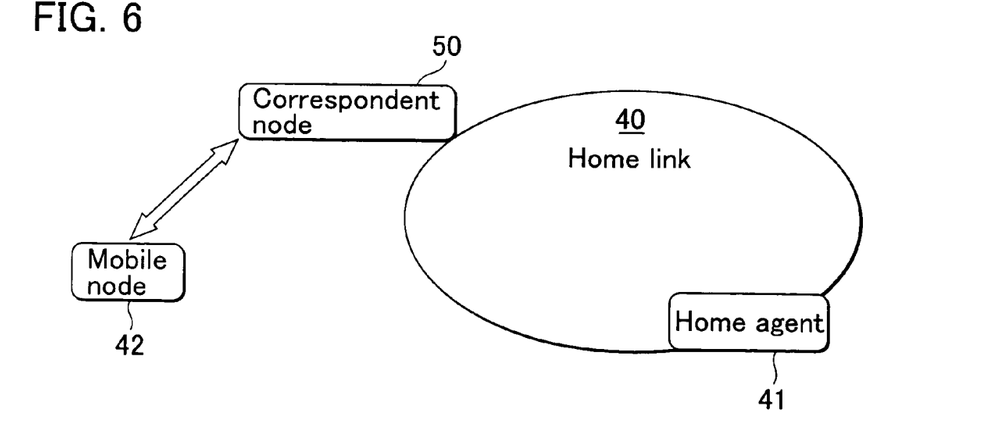
FIG. 6 is a schematic block diagram illustrating a method of direct communication.

FIG. 4 is a schematic block diagram illustrating system operation when correspondent node 50 has a route optimization function. If correspondent node 50 has a route optimization function, the node returns an HoT (4) packet (Home Test: home test) and a CoT (3) packet (Care-of Test: care-of test) respectively, in response to HoTI (2) and to CoTI (1) packets sent from mobile node 42. Upon receipt of these packets, the mobile node immediately stops resending the HoTI (2) and CoTI (1) packets, and proceeds to a position registration procedure shown in FIG. 5 to conduct the route optimization procedure. The position registration procedure is completed when mobile node 42 sends a binding update (BU) packet to correspondent node 50 and the correspondent node returns a binding acknowledgement (BA) packet as necessary, as shown in FIG. 5. Hereafter, mobile node 42 can communicate directly with correspondent node 50 without routing through home agent 41, as shown in FIG. 6.

Figure 7:
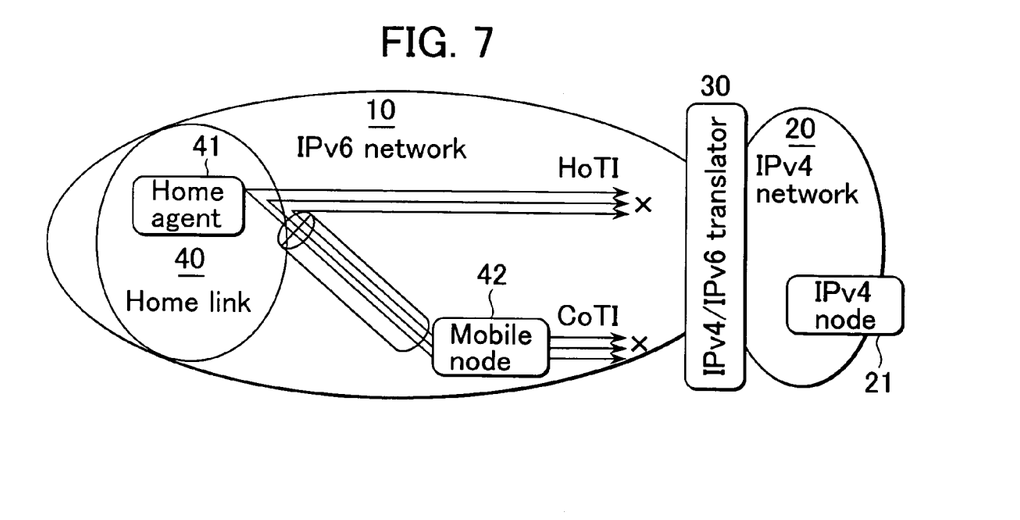
FIG. 7 is a schematic block diagram illustrating a route optimization procedure.
Figure 8:
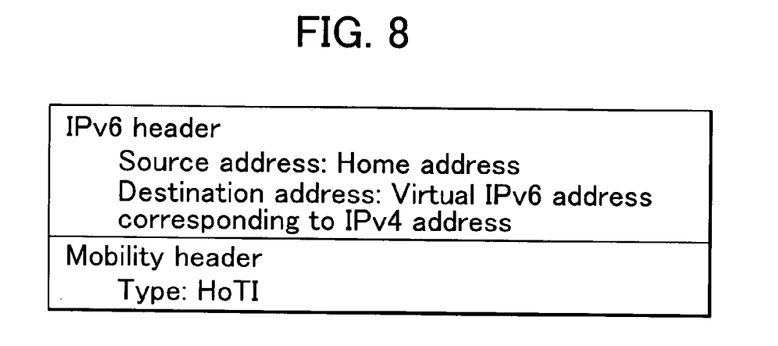
FIG. 8 is a schematic view illustrating the format of an HoTI packet.
Figure 9:
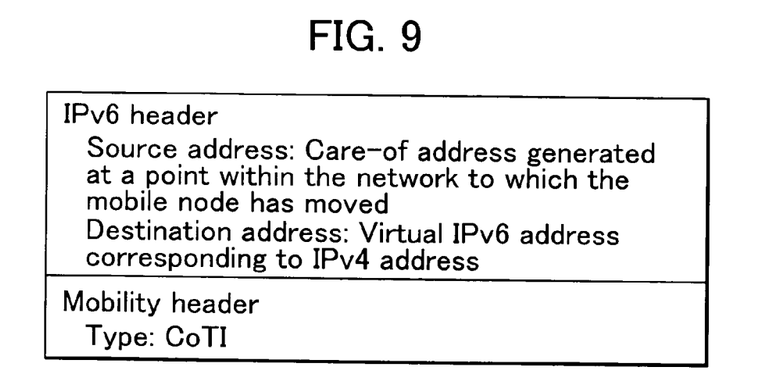
FIG. 9 is a schematic view illustrating the format of a CoTI packet.

When mobile node 42 conducts the route optimization procedure through IPv4/IPv6 translator 30 by means of communication with IPv4 node 21 as shown in FIG. 7, IPv4/IPv6 translator 30 receives an HoTI packet formatted as shown in FIG. 8 and a CoTI packet formatted as shown in FIG. 9, from mobile node 42.

The HoTI packet of FIG. 8 is composed of an IPv6 header and a mobility header. The source address of the IPv6 header denotes a home address and the destination address thereof denotes a virtual IPv6 address corresponding to an IPv4 address. The type of the mobility header is HoTI.

The CoTI packet of FIG. 9 is also composed of an IPv6 header and a mobility header. The source address of the IPv6 header denotes a care-of address generated at a point to which the mobile node has moved and the destination address denotes the virtual IPv6 address corresponding to the IPv4 address. The type of the mobility header is CoTI.

Figure 10:
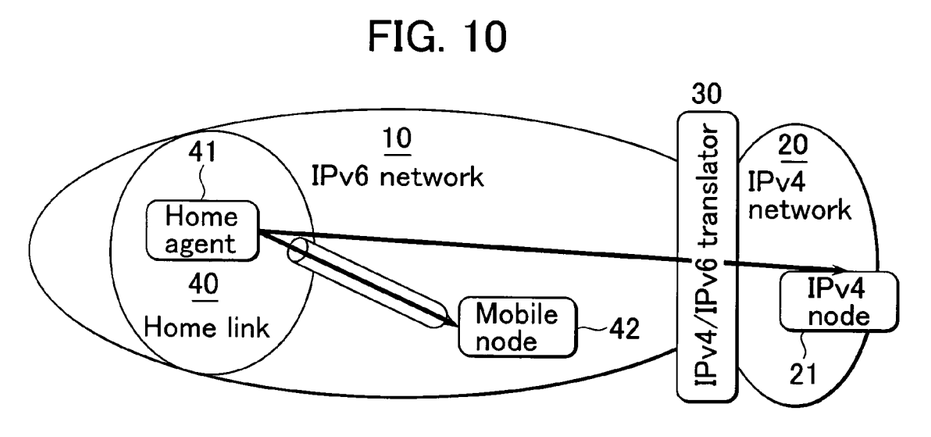
FIG. 10 is a schematic block diagram illustrating a method of communication when the bidirectional tunnel is used by way of the home agent.

In MIPv6, the mobility header is defined as an IPv6 extension header. In addition, an IPv4/IPv6 translator that utilizes the exiting NAT-PT specification ignores the IPv6 extension header according to the specification. Therefore, it is not possible for the conventional IPv4/IPv6 translator 30 to prevent HoTI and CoTI packets from being re-sent from mobile node 42 (see FIG. 7). Nor is it possible to use an optimized route for communication between mobile node 42 and IPv4/IPv6 translator 30. Accordingly, communication is always carried out by way of home agent 41 using the bidirectional tunnel, as shown in FIG. 10.

In other words, according to the conventional system configuration, although the route optimization procedure is conducted under normal conditions when mobile node 42 carries out communication from an external link, it is not possible to prevent HOTI and CoTI packets from being re-sent from mobile node 42 at that time. This results in the problem that the amount of load on mobile node 42 increases.

In addition, it is not possible for mobile node 42 to use an optimized route leading to IPv4/IPv6 translator 30. This results in another problem that the amount of traffic from mobile node 42 to IPv4/IPv6 translator 30 increases.

Furthermore, mobile node 42 always carries out communication by way of home agent 41, using the bidirectional tunnel. This results in yet another problem that it is not possible for IPv4/IPv6 translator 30 to know which network mobile node 42 is actually moving toward.

SUMMARY OF THE INVENTION

The present invention is intended to solve the aforementioned problems. An object of the invention, therefore, is to provide a network system wherein it is possible to reduce the amount of load on the mobile node and the amount of traffic from the mobile node to the IPv4/IPv6 translator and it is possible for the IPv4/IPv6 translator to know the node's current position within the IPv6 network in which the mobile node is moving.

Accordingly, the present invention provides a network system that uses an IPv4/IPv6 translator for bilaterally translating packets between IPv6 and IPv4 protocols, where the translator is equipped with an address table for storing home addresses and care-of addresses in pairs for each MIPv6 mobile node and the translator is made to behave as a correspondent node of the MIPv6 mobile node in question after the mobile node has moved out of the home link thereof.

In addition, the IPv4/IPv6 translator is equipped with a packet processing section for processing packets received from each MIPv6 mobile node and communicates with the MIPv6 mobile node via a route optimized according to the results of the packet processing.

Furthermore, the packet processing section of the IPv4/IPv6 translator processes an extension header if a packet received from the MIPv6 mobile node contains an extension header.

According to the present invention, when the MIPv6 protocol based mobile node moves out of a home link to an external link on the IPv6 network and communicates with a node on the IPv4 network from the external link via the IPv4/IPv6 translator, the IPv4/IPv6 translator can behave as a correspondent node, which is the communication counterpart of the MIPv6 mobile node, on behalf of the IPv4 node. Thus, it is possible to reduce the amount of traffic from the mobile node to the IPv4/IPv6 translator.

In addition, in cases where the route optimization function of MIPv6 is used, it is possible to carry out communication via the optimized route from the mobile node to the IPv4/IPv6 translator.

DETAILED DESCRIPTION OF THE PREFERRED EMBODIMENTS

Preferred embodiments of the present invention are described in detail below with reference to the accompanying drawings.

Figure 11:
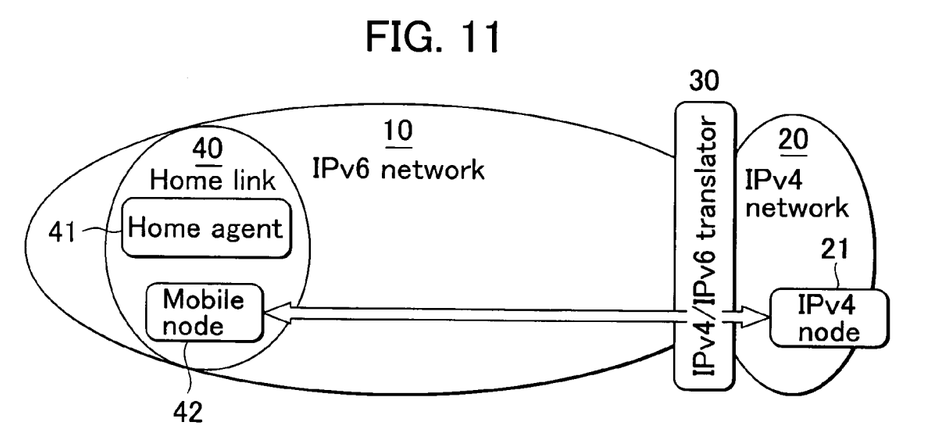
FIG. 11 is a schematic block diagram illustrating one embodiment of the present invention.

FIG. 11 is a schematic block diagram illustrating one embodiment of the present invention, wherein elements identical with those in FIGS. 7 and 10 are referenced alike in FIG. 11.

The present invention provides a mechanism whereby IPv6 node 11 belonging to IPv6 network 10 can communicate with IPv4 node 21 which is the communication counterpart thereof and belongs to IPv4 network 20, without having to be conscious of the fact that IPv4 node 21 has no MIPv6 functions, on the assumption that:

1) when communication is carried out between IPv6 node 11 belonging to IPv6 network 10 and IPv4 node 21 belonging to IPv4 network 20, IPv4/IPv6 translator 30 is used to bilaterally translate packets between IPv6 and IPv4 protocols; and
2) MIPv6 is used so that IPv6 node 11 belonging to IPv6 network 10 can still carry out communication using the same address even after the node has moved out of the network.

When mobile node 42 stays at home link 40 within IPv6 network 10, in other words, before the node moves out of the link, the node can communicate with IPv4 node 21 belonging to IPv4 network 20 by way of IPv4/IPv6 translator 30 as shown in FIG. 11, without the use of the MIPv6 functions.

In contrast, when mobile node 42 moves out of home link 40 within IPv6 network 10 and communicates with IPv4 node 21 on IPv4 network 20 from an external network, the route optimization procedure is conducted under normal conditions. At this point, mobile node 42 sends HoTI and CoTI packets to a virtual IPv6 address correlating to the IPv4 address of the communication counterpart IPv4 node 21.

In response to this route optimization procedure attempted by mobile node 42, IPv4/IPv6 translator 30 can select from the following two operating mode options according to the management policy of the system administrator:

(a) The optimized route is not used in communication between mobile node 42 and IPv4/IPv6 translator 30.
(b) The optimized route is used in communication between mobile node 42 and IPv4/IPv6 translator 30.

Operating Mode (a)

IPv4/IPv6 translator 30 rejects the use of the optimized route by returning ICMP error packets respectively in response to HoTI and CoTI packets sent by mobile node 42, thereby preventing mobile node 42 from resending the HoTI and CoTI packets. After receiving these packets, mobile node 42 does not attempt the route optimization procedure and carries out communication by way of home agent 41 using the bidirectional tunnel, as in the case of FIG. 10.

Figure 12:
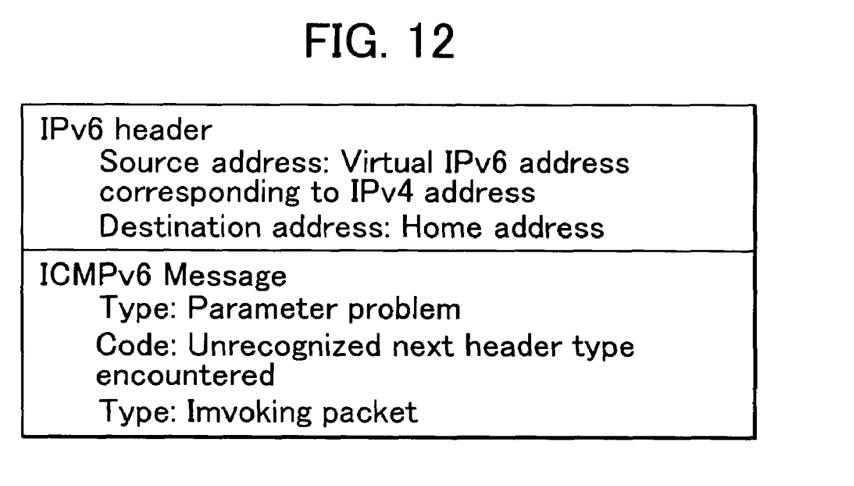
FIG. 12 is a schematic view illustrating the format of an ICMP error packet transmitted in response to an HoTI packet.

FIG. 12 is a schematic view illustrating the format of an ICMPv6 error packet transmitted in response to an HoTI packet. The ICMPv6 error packet is composed of an IPv6 header and an ICMPv6 message. The source address of the IPv6 header denotes a virtual IPv6 address corresponding to an IPv4 address, while the destination address denotes a home address. The type of ICMPv6 message is a parameter problem and the code thereof is "unrecognized next header type encountered".

Figure 13:
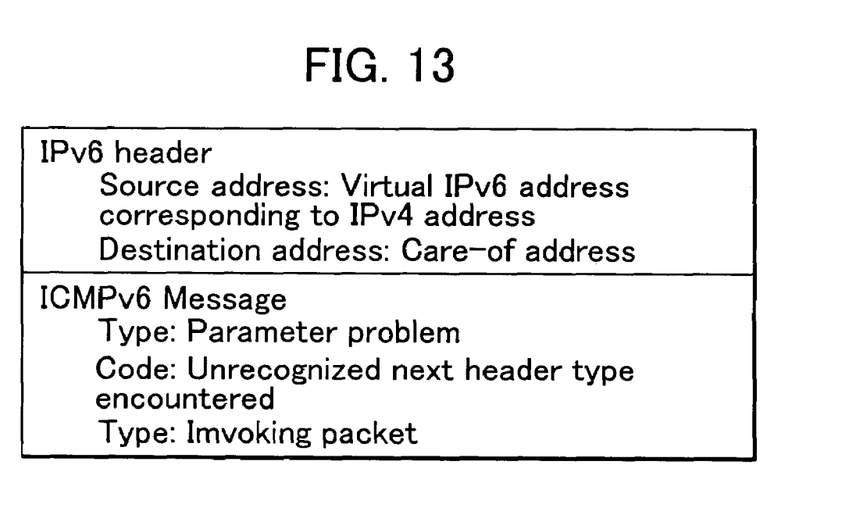
FIG. 13 is a schematic view illustrating the format of an ICMP error packet transmitted in response to a CoTI packet.

FIG. 13 is a schematic view illustrating the format of an ICMPv6 error packet transmitted in response to a CoTI packet. The ICMPv6 error packet is also composed of an IPv6 header and an ICMPv6 message. The source address of the IPv6 header denotes a virtual IPv6 address corresponding to an IPv4 address, while the destination address denotes a care-of address. The type of ICMPv6 message is a parameter problem and the code thereof is "unrecognized next header type encountered".

Operating Mode (b)

IPv4/IPv6 translator 30 can use the optimized route by returning HoT and CoT packets respectively in response to HoTI and CoTI packets sent by mobile node 42.

Figure 14:
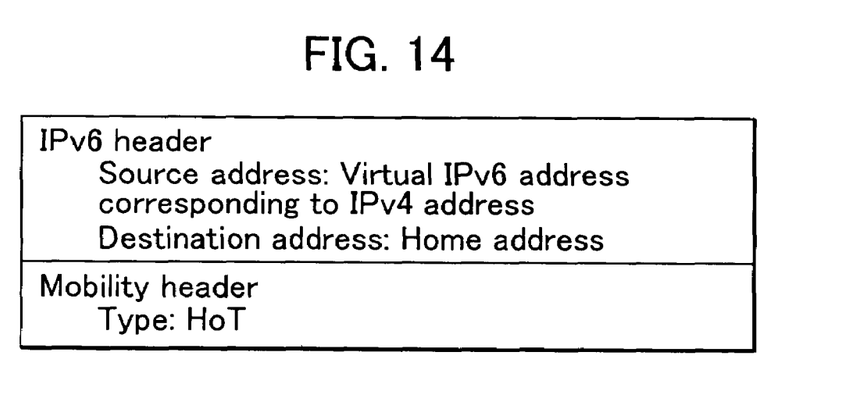
FIG. 14 is a schematic view illustrating the format of an HoT packet.

FIG. 14 is a schematic view illustrating the format of an HoT packet. The HoT packet is composed of an IPv6 header and a mobility header. The source address of the IPv6 header denotes a virtual IPv6 address corresponding to an IPv4 address, while the destination address denotes a home address. The type of the mobility header is HoT.

Figure 15:
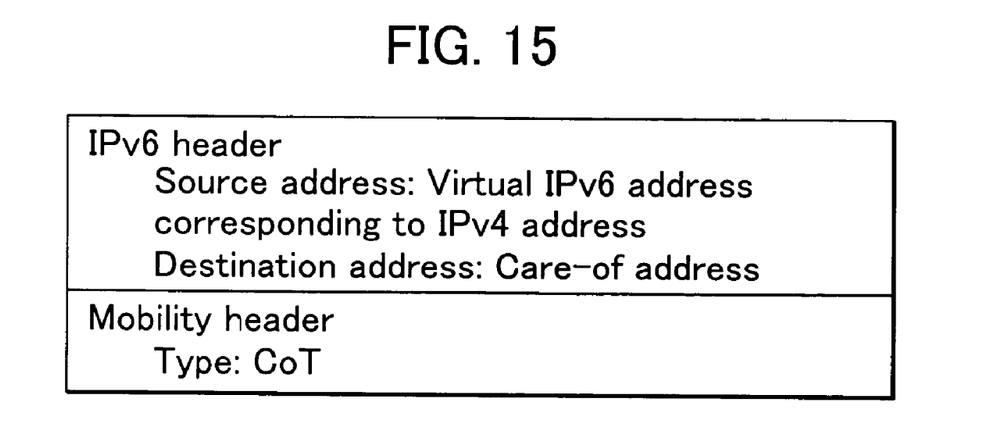
FIG. 15 is a schematic view illustrating the format of a CoT packet.

FIG. 15 is a schematic view illustrating the format of a CoT packet. The CoT packet is composed of an IPv6 header and a mobility header. The source address of the IPv6 header denotes a virtual IPv6 address corresponding to an IPv4 address, while the destination address denotes a care-of address. The type of the mobility header is CoT.

Upon receipt of these packets, mobile node 42 stops resending the HoTI and CoTI packets. Then, the node conducts the position registration procedure by sending a BU packet to IPv4/IPv6 translator 30. IPv4/IPv6 translator 30 returns a BA packet as necessary.

Figure 16:
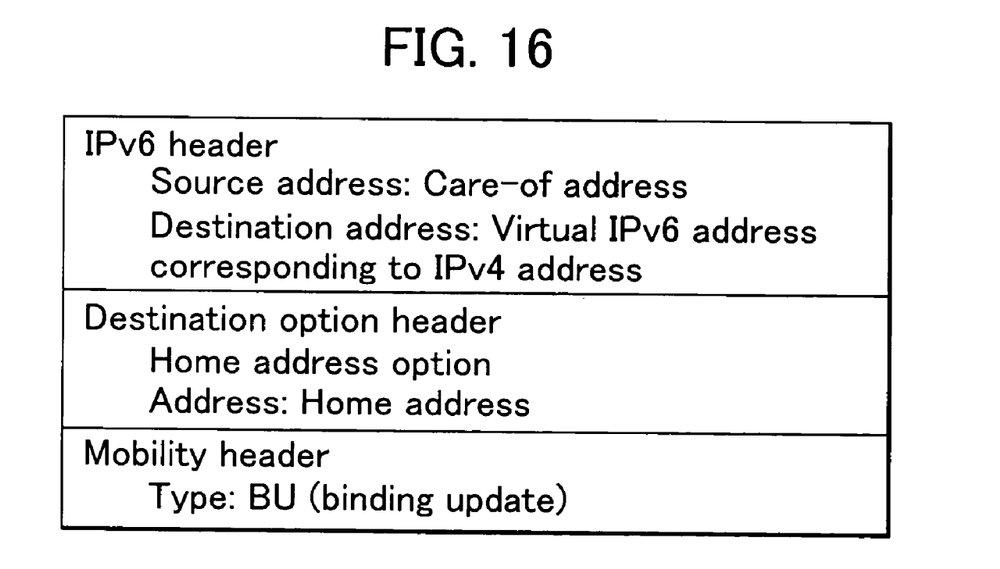
FIG. 16 is a schematic view illustrating the format of a BU packet.

FIG. 16 is a schematic view illustrating the format of a BU packet. The BU packet is composed of an IPv6 header, a destination option header, and a mobility header. The source address of the IPv6 header denotes a care-of address, while the destination address denotes a virtual IPv6 address corresponding to an IPv4 address. The address among the home address options of the destination option header denotes a home address. The type of the mobility header is BU.

Figure 17:
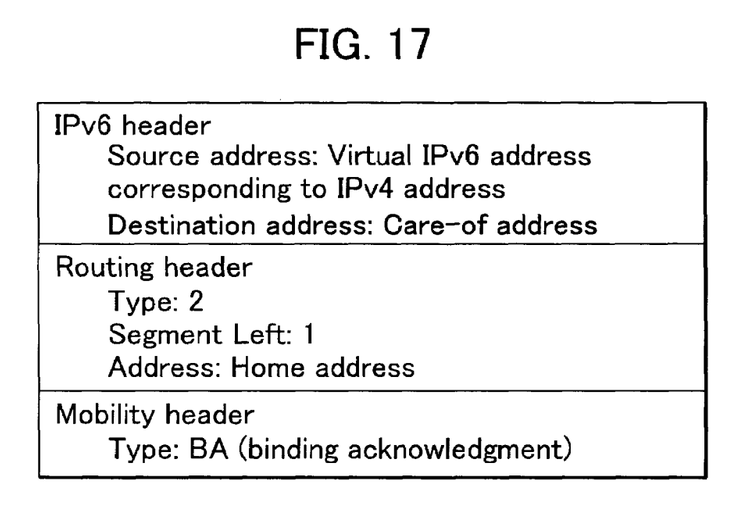
FIG. 17 is a schematic view illustrating the format of a BA packet.

FIG. 17 is a schematic view illustrating the format of a BA packet. The BA packet is composed of an IPv6 header, a routing header, and a mobility header. The source address of the IPv6 header denotes a virtual IPv6 address corresponding to an IPv4 address, while the destination address denotes a care-of address. The type of the routing header is 2, the Segment Left is 1, and the address denotes a home address. The type of the mobility header is BA.

Figure 18:
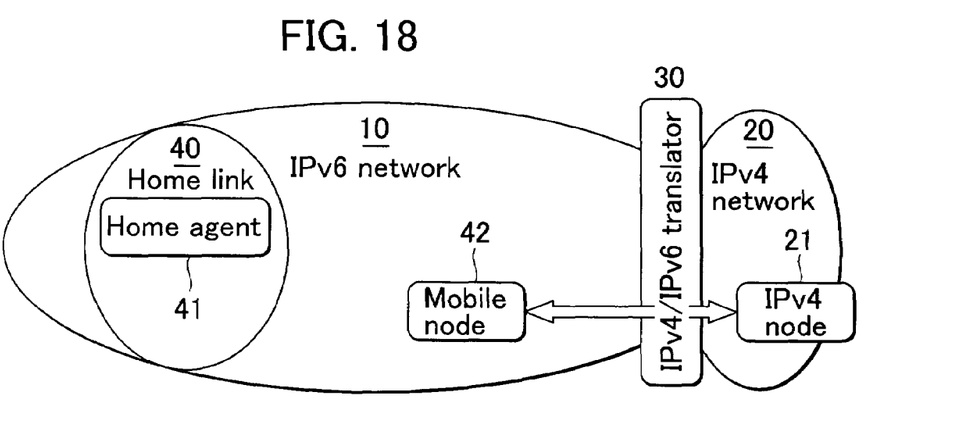
FIG. 18 is a schematic block diagram illustrating a communication route taken after the position registration procedure is completed.

When the aforementioned position registration procedure is completed by mobile node 42, IPv4/IPv6 translator 30 has a table correlating between the home address and care-of address of mobile node 42. Thus, communication between mobile node 42 and IPv4/IPv6 translator 30 is carried out via the optimized route, as shown in FIG. 18.

Now it is assumed that IPv6 node 11 belonging to IPv6 network 10 uses services available on the existing IPv4 network 20 via IPv4/IPv6 translator 30. If mobile node 42 begins communicating with IPv4 node 21 before the node moves out, the route optimization procedure is conducted for IPv4/IPv6 translator 30 after the node has moved out. In this case, if IPv4/IPv6 translator 30 uses the route optimization function, mobile node 42 can continue to communicate with IPv4 node 21 via the optimized route even after the node has moved out.

If IPv4/IPv6 translator 30 does not use the route optimization function, it is possible to promptly prevent mobile node 42 from going through the route optimization procedure and to reduce the amount of load on mobile node 42.

Figure 19:
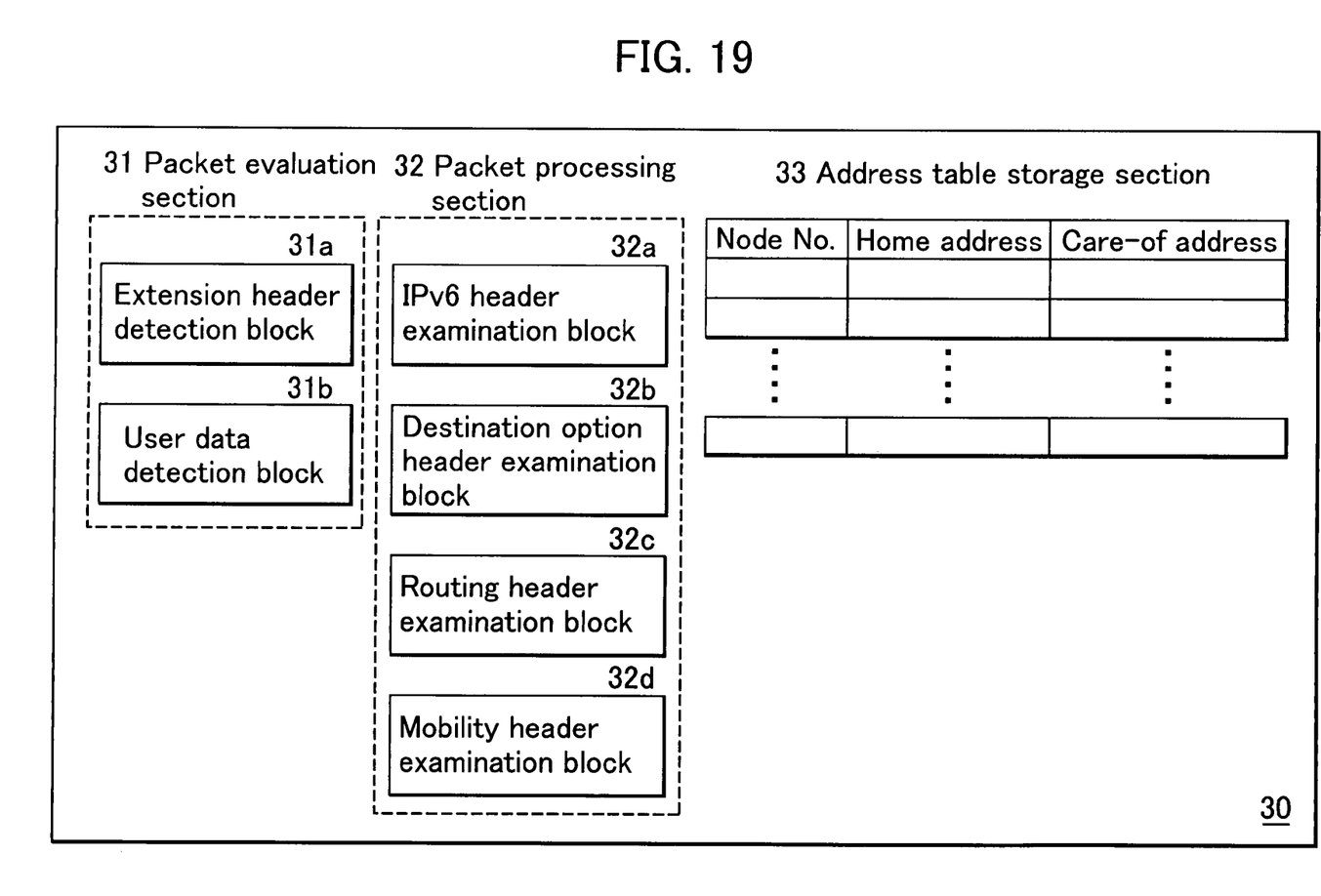
FIG. 19 is a schematic block diagram illustrating a specific example of a principal part of IPv4/IPv6 translator 30 in accordance with the present invention.

FIG. 19 is a schematic block diagram illustrating a specific example of a principal part of IPv4/IPv6 translator 30 in accordance with the present invention. The principal part comprises packet evaluation section 31, packet processing section 32, and address table storage section 33, for example.

Packet evaluation section 31 evaluates the configuration of a packet received from the MIPv6 mobile node as to whether the packet contains an extension header only, user data only, both an extension header and user data, or neither an extension header nor user data.

Packet processing section 32 comprises IPv6 header examination block 32a, destination option header examination block 32b, routing header examination block 32c, and mobility header examination block 32d, for example.

Packet processing block 32 performs extension header processing if the packet received from the MIPv6 mobile node contains an extension header. When processing the mobility header, packet processing block 32 generates an address table listing home addresses and care-of addresses in pairs for each MIPv6 mobile node and stores the table in address table storage section 33.

As a result, it is possible for IPv4/IPv6 translator 30 to behave as a correspondent node of the MIPv6 mobile node and to know precisely the position toward which each MIPv6 mobile node is moving or the current position thereof.

What is claimed is:

1. A network system comprising:
    an IPv4/IPv6 translator for bilaterally translating packets between IPv6 and IPv4 protocols; and
    mobile IPv6 (MIPv6) mobile nodes for transmitting a home test initialization packet (HoTI) having a source address as home addresses and a care of test initialization packet (CoTI) having a source address as care-of addresses after moved out of a home link thereof;
    said IPv4/IPv6 translator comprising:
        an address table for storing said home addresses and said care-of addresses in pairs for each of the MIPv6 mobile nodes;
        two operating modes to communicate with the MIPv6 mobile nodes, said two modes being an optimized mode and an un-optimized mode;
        wherein in the un-optimized mode, said IPv4/IPv6 translator functions as a correspondent node by maintaining an ongoing communication that returns an ICMP error to said MIPv6 mobile nodes in response to said HoTI and said CoTI received respectively from said MIPv6 mobile nodes;
        wherein in the optimized mode, said IPv4/IPv6 translator functions as the correspondent node by storing said home addresses and said care-of addresses of said MIPv6 mobile nodes in said address table in response to said HoTI and said CoTI, and executes a route optimization on behalf (by proxy) of said IPv4 node without transferring said HoTI and said CoTI to said IPv4 node, and conducting a position registration procedure on behalf (by proxy) of said IPv4 node without transferring a binding update packet (BU) received from said MIPv6 mobile nodes to said IPv4 node.

2. The network system of claim 1, wherein said IPv4/IPv6 translator is equipped with a packet processing section for processing packets received from each of the MIPv6 mobile nodes and communicates with said MIPv6 mobile node via a route optimized according to the results of said packet processing.

3. The network system of claim 1 or 2, wherein the packet processing section of said IPv4/IPv6 translator performs extension header processing if a packet received from said MIPv6 mobile node contains an extension header.

* * * * *